April 6, 1954
F. F. FOOTE
2,674,353
GRAVE MARKER WITH EDGING DEVICE
Filed Sept. 6, 1949
2 Sheets-Sheet 1
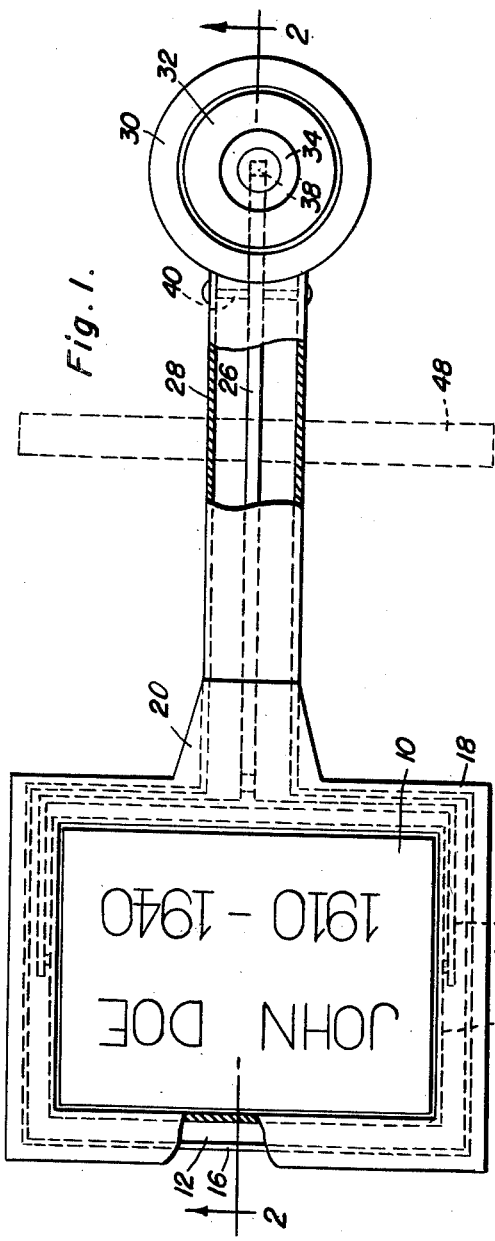
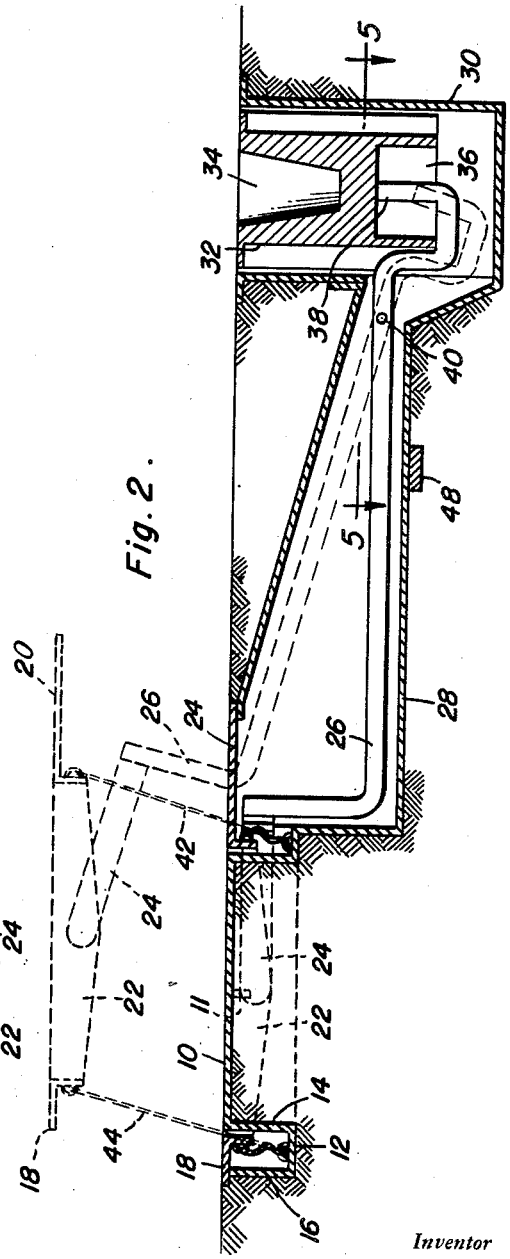
Inventor
Fred F. Foote
By *Clarence A. O'Brien
and Harvey B. Jacobson*
Attorneys April 6, 1954　　　　F. F. FOOTE　　　2,674,353
GRAVE MARKER WITH EDGING DEVICE
Filed Sept. 6, 1949　　　　　　　　　　2 Sheets-Sheet 2

Inventor
Fred F. Foote
By Clarence A. O'Brien
and Harvey B. Jacobson
Attorneys

Patented Apr. 6, 1954

2,674,353

UNITED STATES PATENT OFFICE 2,674,353

GRAVE MARKER WITH EDGING DEVICE

Fred F. Foote, Falls Church, Va.

Application September 6, 1949, Serial No. 114,087

1 Claim. (Cl. 189—21.1)

This invention relates to novel and useful improvements in edgers or cutters for maintaining a neat and orderly edge around a stationary object.

An object of this invention is to maintain a neat and orderly edge around a grave marker by means of reciprocating a cutter member which is operatively connected with a trough disposed in the soil so as to cut the grass around the grave marker and so as to prevent the growth of grass very close to the marker.

Another object of this invention is to combine two features in a single structure namely, a foot operator for the cutter or cutting member and a receptacle for flowers or an additional flower pot; the foot operator being remote from the marker but operatively connected therewith through a connecting link or lever.

Other objects and features will become apparent in following the description of the illustrated form of the invention.

Figure 1 is a plan view of the device;

Figure 2 is a longitudinal sectional view taken substantially on the line 2—2 of Figure 1 in the direction of the arrows;

Figure 3:
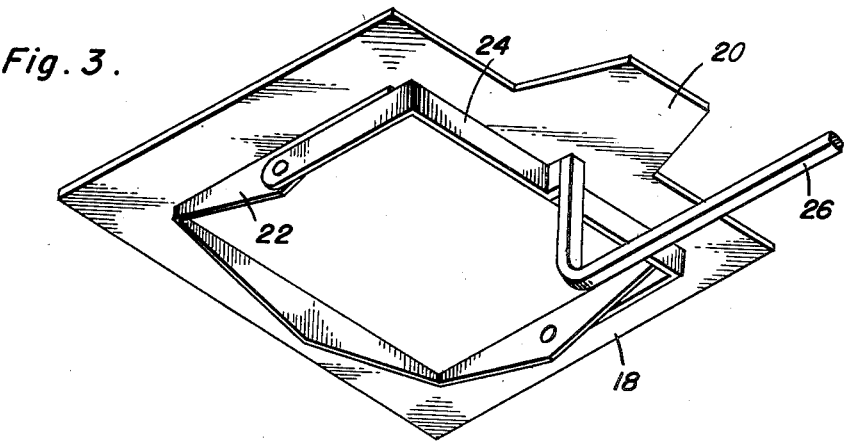
Figure 3 is a perspective view of the cutter.
Figure 4:
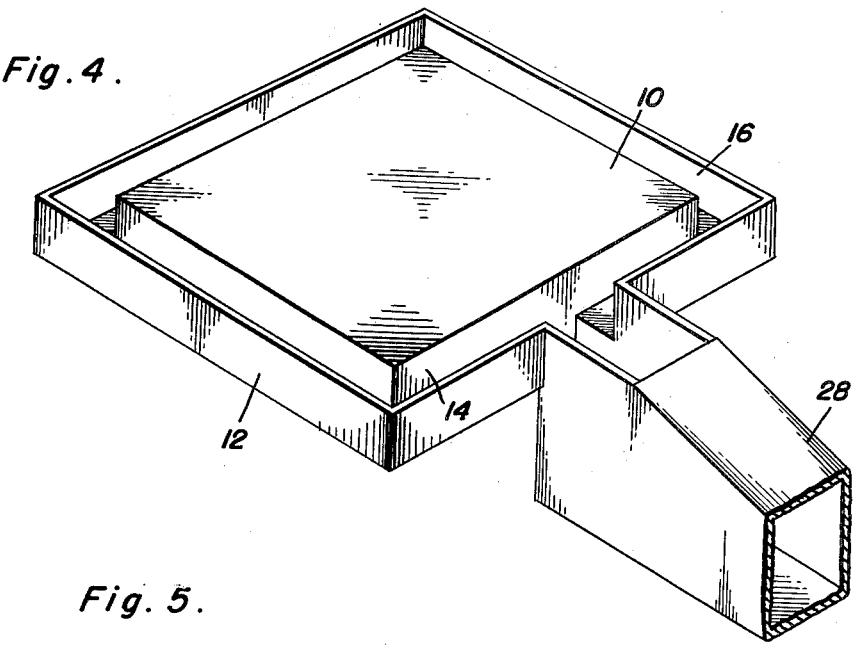
Figure 4 is a fragmentary perspective view of the lever case or housing together with the trough which is adapted to be disposed around the grave marker.
Figure 5:
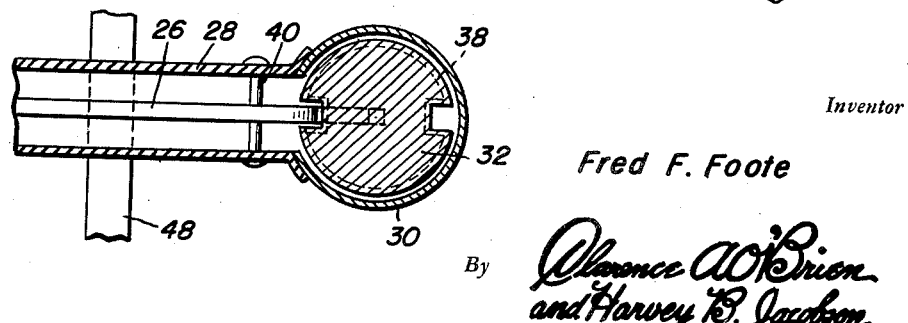
Figure 5 is a sectional view taken substantially on the line 5—5 of Figure 2 and in the direction of the arrows.

In Figure 1 and Figure 2 the general arrangement of structural elements forming the invention is shown. A grave marker 10 which in this instance is a flat plate with tongues 11 embedded in a concrete base and which is connected with the upper edge of a trough 12, is provided. An ordinary or conventional grave marker may be employed by obviating the flat plate 10 and simply providing the trough of substantially channelshape stock. Either of the two alternatives are contemplated by the present invention.

The trough 12 extends around the marker 10 and includes an inside wall 14 as well as an outside wall 16 connected with the bottom thereof as disclosed in Figure 2. The trough is adapted to be disposed below the ground and around the marker 10. The upper edge of the wall 16 is slightly lower than the upper edge of the wall 14 so that it may accommodate the flange 18 of the cutter or cutting member.

The cutter or cutting member consists of the flange 18 which is substantially flat and which has a tongue 20 projecting from one edge thereof. A skirt 22 depends therefrom forming a bearing surface for the bifurcations 24. The bifurcations have a lever or arm 26 extending therefrom which is disposed in the case or housing 28.

The case or housing is also disposed below the soil and is tubular in shape. A receptacle 30 is disposed at one end of the casing 28 and has an open top. This receptacle accommodates the reversible vase and foot operating member 32 which has a recess 34 therein so as to accommodate flowers or a flower pot.

As disclosed in Figure 1 the foot operator 32 is remote from the grave marker 10 whereby flowers may appropriately and properly be placed therein.

The lower end or bottom of the foot operator 32 is provided with an opening 36 which has the upwardly extending end portion 38 of the lever 26 disposed therein. Since the pivot pin 40 pivotally connects the lever 26 with two side walls of the housing 28, foot pressure or hand pressure applied to the foot operating member 32 will cause reciprocation thereof. This reciprocation will in turn be imparted to reciprocatory movement of the cutter to the lever 26. The cutter has a pair of ropes or cables 42 and 44 respectively fixed thereto and also fixed to the inside of the trough 12. This limits the upward travel of the cutter.

The utility of the tongue 20 is to cover the aperture in the top of the housing 28. This aperture is necessary to provide clearance for operation of the lever 26 (Figure 2).

In order to firmly anchor the housing 28 in the ground, a cross rod 48 is fixed to the bottom surface thereof and is disposed in the ground as disclosed in Figure 1.

As to the operation of the cutter, the flange 18 prevents growth of grass adjacent the marginal edges of the grave marker. What growth does actually appear on the top of the flange 18 is pulled from the ground by foot application of pressure to the foot operator 32. If there are any blades of grass which fall or naturally become seated over the upper edge of the wall 16 of the trough, they are cut when the cutter is allowed to return to inoperative connection with the trough due to the pull of gravity.

Having described the invention, what is claimed as new is:

A combination device comprising a grave marker and a device for edging the marker, said combination device comprising a member having an upper surface upon which lettering is adapted to be disposed, a trough located around the edges of said member, said trough having an inner wall with the upper edge thereof terminating even with the upper surface of said member and an outer wall having an upper edge terminating below the upper edge of the inner wall, said outer wall constituting a fixed cutter member, an edging device constituting a movable cutter member, said edging device being formed of a horizontally disposed plate having a central opening therein receiving the upper portion of said inner wall, said plate having a lower surface engaging the upper edge of said outer wall and an upper surface lying in the same plane as the upper edge of the inner wall when the plate is in lowered position, a downwardly extending skirt portion secured to said plate adjacent the opening therein and means operatively secured to said skirt portion for raising and lowering the plate with respect to the member and the trough.

References Cited in the file of this patent

UNITED STATES PATENTS

| Number | Name | Date |
|---|---|---|
| 207,155 | Bassett | Aug. 20, 1878 |
| 236,613 | Nelson | Jan. 11, 1881 |
| 1,357,842 | Cameron | Nov. 2, 1920 |
| 1,537,537 | Liebscher | May 12, 1925 |
| 1,627,258 | Sullivan | May 3, 1927 |
| 1,688,271 | Finch | Oct. 16, 1928 |
| 2,274,451 | Kyle | Feb. 24, 1942 |

FOREIGN PATENTS

| Number | Country | Date |
|---|---|---|
| 170,948 | Germany | May 26, 1906 |